United States Patent [19]

Davis

[11] Patent Number: 4,745,700
[45] Date of Patent: May 24, 1988

[54] FISHING LURE

[76] Inventor: Jack Davis, Star Rte. 2, Box 475, Crescent City, Fla. 32012

[21] Appl. No.: 852,813

[22] Filed: Apr. 16, 1986

[51] Int. Cl.⁴ ............................................. A01K 85/00
[52] U.S. Cl. .................................. 43/42.13; 43/42.11; 43/42.31; 43/42.39
[58] Field of Search .................. 43/42.11, 42.13, 42.22, 43/42.27, 42.48, 42.31, 42.39, 42.74

[56] References Cited

U.S. PATENT DOCUMENTS

| | | |
|---|---|---|
| 2,157,003 | 5/1939 | Mussina ............................... 43/42.74 |
| 2,281,578 | 5/1942 | Heddon ............................... 43/42.13 |
| 2,292,517 | 8/1942 | Greene ................................ 43/42.39 |
| 2,543,293 | 2/1951 | Leitch ................................. 43/43.16 |
| 2,693,049 | 11/1954 | Atton .................................. 43/42.39 |
| 2,983,065 | 5/1961 | Ferguson ............................ 43/42.13 |
| 3,158,953 | 12/1964 | Filler .................................. 43/42.39 |
| 3,253,363 | 5/1966 | Steehn ................................ 43/42.13 |
| 3,257,750 | 6/1966 | Shannon . | |
| 3,341,966 | 9/1967 | Pippen ................................ 43/42.39 |
| 4,012,862 | 3/1977 | Dubois . | |
| 4,033,065 | 7/1977 | Shannon ............................. 43/42.13 |
| 4,209,932 | 7/1980 | Pate .................................... 43/42.13 |
| 4,320,592 | 3/1982 | Kirsch ................................ 43/42.39 |
| 4,329,804 | 5/1982 | Brown ................................ 43/42.13 |

Primary Examiner—Kurt Rowan
Attorney, Agent, or Firm—Jones, Askew & Lunsford

[57] ABSTRACT

A fishing lure which remains in an upright attitude while sinking in the water or resting on the bottom. The fishing lure includes a body and a fishing hook, and has a buoyant member at one side of the lure body. The buoyant member has sufficient buoyancy to maintain the lure body and the fish hook in a predetermined upright attitude while the lure sinks in the water. The buoyant member is hollow and contains loose shot, which produces a rattling noise as the buoyant member gyrates when the lure is pulled through the water.

4 Claims, 2 Drawing Sheets

FISHING LURE

FIELD OF THE INVENTION

This invention relates in general to fishing lures, and relates in particular to a fishing lure which remains in an upright attitude particularly while sinking or resting on the bottom.

BACKGROUND OF THE INVENTION

Fishing lures and artificial baits are available in various sizes and shapes, all having the purpose of attracting fish to take the bait. Fishing lures, whatever their size or description, thus attempt to simulate the size, shape, appearance, movement through the water, or other attributes of the fish's normal prey.

Except for fly fishing, fishing lures are usually non-buoyant and thus intentionally sink in the water. The typical lure of this kind simulates the size and appearance of a minnow or other bait. After the fisherman casts, the lure sinks below the surface of the water, simulating the appearance and movement of live bait and hopefully causing a fish to strike. These lures frequently come equipped with fish-attracting aids such as noise-making devices, spinners, or spoons, intended to attract fish as the lure sinks through the water. During this time the fisherman may impart forward motion to the sinking lure by pulling back the tip of the fishing rod, and then lowering the rod tip while reeling in some of the fishing line. This periodic forward movement combines with the downward sinking movement of the lure to move the lure erratically through the water, again to simulate the movement of a minnow or other live bait. The fisherman at times may let the lure come to rest on or near the bottom, seeking fish at that location.

Whether or not the fisherman intentionally lets the lure reach the bottom, lures frequently become hooked on grass or debris near the bottom of the water being fished. Although lures can snag underwater structure above the bottom, e.g., tree limbs or the like, the risk of snagging the lure is particularly great when the lure actually rests on the bottom. Even if the fish hook(s) of the lure are not attached to the bottom of the lure body, the lure at rest on the bottom tends to roll over or tip downwardly, placing the pointed end of the fish hook on the bottom and at risk of snagging bottom structure when the fisherman next cranks his pole. At the least, snagging one's lure is annoying; at worst, the snagged lure cannot be worked loose and is lost when the fishing line breaks or is cut.

STATEMENT OF THE INVENTION

Stated in general terms, the fishing lure of the present invention remains upright in the water, at least as the lure sinks to the bottom and while resting on the bottom. This result is accomplished by providing the lure with a buoyant member which maintains the lure in an upright attitude in the water, although the buoyant member lacks sufficient buoyancy to prevent the lure from sinking. The fish hook of the lure is arranged so that the pointed end maintains a predetermined attitude, preferably upright or above the body of the lure, as the buoyant member maintains the lure in a desired upright attitude.

Stated somewhat more particularly, fishing lures according to the present invention include a lure body, and further include an arm extending outwardly from the lure body. A buoyant member is attached to the arm in spaced apart relation to one side of the lure body, and maintains the lure body in an upright attitude as the lure travels through the water or sinks toward the bottom. The arm preferably supports the buoyant member at a position which places the center of buoyant force passing through the body of the lure, thereby maintaining the lure body in a predetermined level attitude as the lure sinks in the water. The fish hook can be attached to the lure body or at one end thereof, preferably with the pointed end of the hook above the body as maintained upright by the buoyant member. When the fishing lure comes to rest on the bottom, the buoyant member maintains the fishing lure in the upright attitude with the pointed end of the hook thus kept out of contact with the bottom. This arrangement greatly reduces or eliminates the likelihood that the pointed end of the hook will become snagged on grass or bottom structure, when the lure is pulled forward.

Stated with further particularity, the buoynt member preferably comprises a hollow asymmetrical float containing a quantity of loose shot. The buoyant member is connected to the arm by a swivel, so that the buoyant member can rotate and gyrate as the lure moves in the water. The float preferably is somewhat elongated or pear-shaped, and the hollow cavity in the interior of the float is narrowed at the end adjacent the swivel connection to the arm extending outwardly from the lure body. The loose shot thus tends to gravitate to the lower end of the cavity when the lure is undergoing little or no forward movement. This arrangement lowers the center of mass of the float as the float pivots to a vertical attitude in the water, thereby enhancing the buoyant effect of the float acting on the arm and the lure body.

However, when the fisherman pulls the lure through the water, the drag force acting on the buoyant member tips the buoyant member back from the position vertical attitude to a diagonal or nearly horizontal attitude. In this tipped-back attitude, the loose shot moves away from the narrow end of the cavity and toward the opposite end of the cavity. This movement of the loose shot within the buoyant member produces a rattling noise attractive to fish, and also changes the center of mass of the buoyant member as the lure moves through the water. The drag forces acting on the asymmetrical float at this time cause the float to rotate or gyrate as the lure is pulled through the water, further agitating the loose shot to produce noise. The external surfaces of the buoyant member preferably are finished so as to visually attract fish as the buoyant member moves through the water.

Accordingly, it is an object of the present invention to provide an improved fishing lure.

It is another object of the present invention to provide a fishing lure which remains in an upright attitude as the lure sinks in the water.

It is a further object of the present invention to provide a fishing lure which maintains the hook out of contact with the bottom, as the lure sinks to rest on the bottom.

Other objects and advantages of the present invention will become more readily apparent from the following description of a preferred embodiment.

DESCRIPTION OF PREFERRED EMBODIMENT

Figure 1:
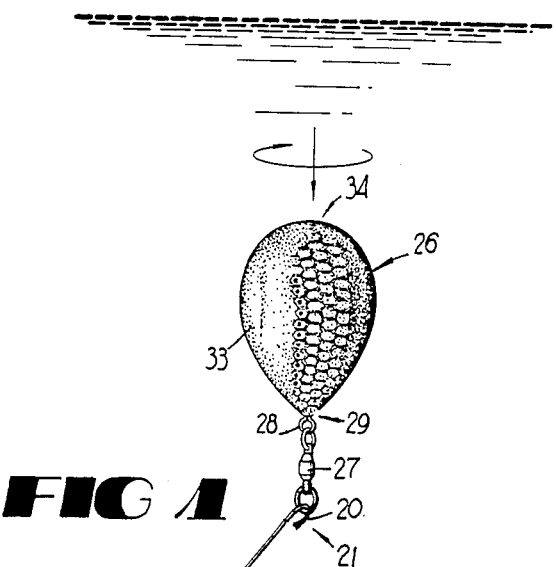
FIG. 1 is a pictorial view showing a fishing lure according to a preferred embodiment of the present invention, showing the lure sinking in the water.

Turning first to FIG. 1, there is shown generally at 10 a fishing lure including a lure body 11 and a fish hook 12 protruding from the back end of the lure body. A skirt 15, of thin strands fabricated from a flexible material such as rubber or the like, extends from the back of the lure body 11 and can partially hide the hook 12 from view. A rigid rod 13 extends forwardly from the front end of the lure body 11 at a slight upward angle relative to the longitudinal axis of the lure body, extending to an eyelet 14 spaced a short distance in front of the lure body. The eyelet 14 provides a point of attachment to a conventional fishing line 18, fragmentarily shown in FIG. 1. The lure body 11 is made of a nonbuoyant material such as lead or the like, and is finished to resemble live bait in the manner known to those skilled in the art.

Figure 2:
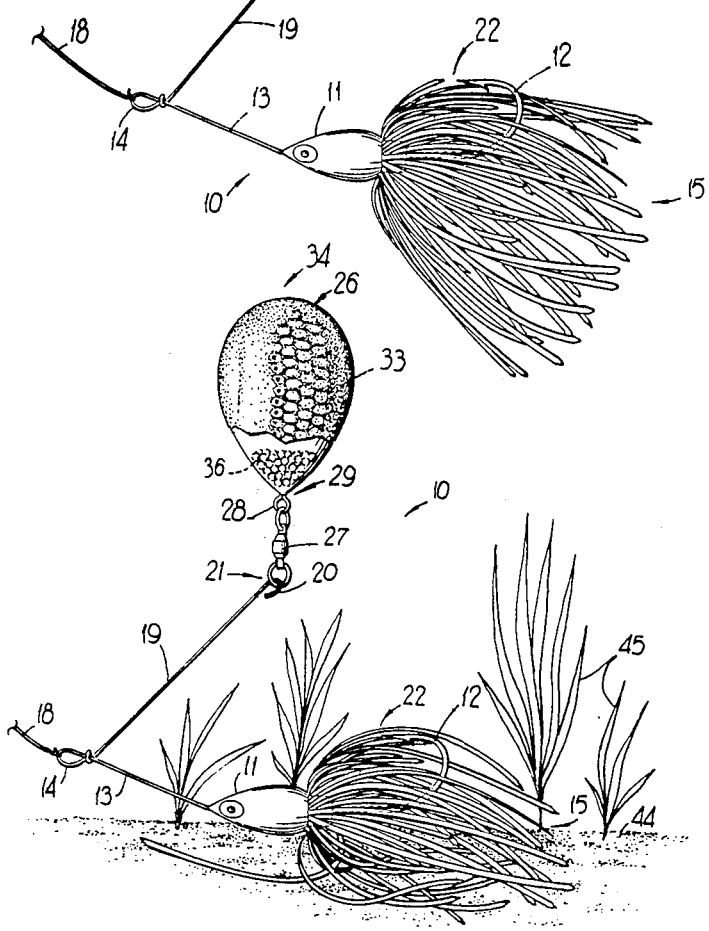
FIG. 2 is a pictorial view showing the fishing lure of FIG. 1, partially broken away, resting on the bottom in a body of water.

An arm 19 joins the rod 13 adjacent the eyelet 14, and extends away from the rod to terminate at an eyelet 20 formed at the remote end 21 of the arm. The length of the arm 19 and the angular orientation of that arm relative to the rod 13, as seen in FIGS. 1 and 2, locate the eyelet 20 spaced a distance laterally apart from a side of the body 11 of the fishing lure. Moreover, the arm 19 and eyelet 20 are on the same side of the lure body 11 as the pointed end 22 of the fish hook 12. Both the arm 19 and the rod 13 are relatively inelastic to maintain this relative position of the eyelet 20. The arm and rod preferably are made of steel or the like; the arm and rod are formed from one piece of metal rod which also incorporates the eyelet 14, in the preferred embodiment.

A buoyant member 26 is attached to the eyelet 20 at the remote end 21 of the arm 19. This attachment preferably is made by a swivel 27 interconnecting the eyelet 20 with the eyelet 28 at the relatively narrow near end 29 of the buoyant member 26. The swivel 27 allows the buoyant member 26 to undergo unrestricted rotation relative to the arm 19, and the interconnections with eyelets 20 and 28 permit universal pivotable movement of the buoyant member relative to the rod 19.

The exterior configuration of the buoyant member 26 is asymmetrical about the longitudinal axis 30, and a hollow cavity 31 is formed within the buoyant member. In the depicted preferred embodiment, one outer side 33 of the buoyant member 26 has an approximately oval or pear-like shape. This pear-like shape of the one side 33 is narrowest at the near end 29 of the buoyant member, adjacent the eyelet 28, and becomes widest at a point somewhat greater than one-half the distance to the far end 34 of the buoyant member, measured along the longitudinal axis 30 of that member.

Figure 4:
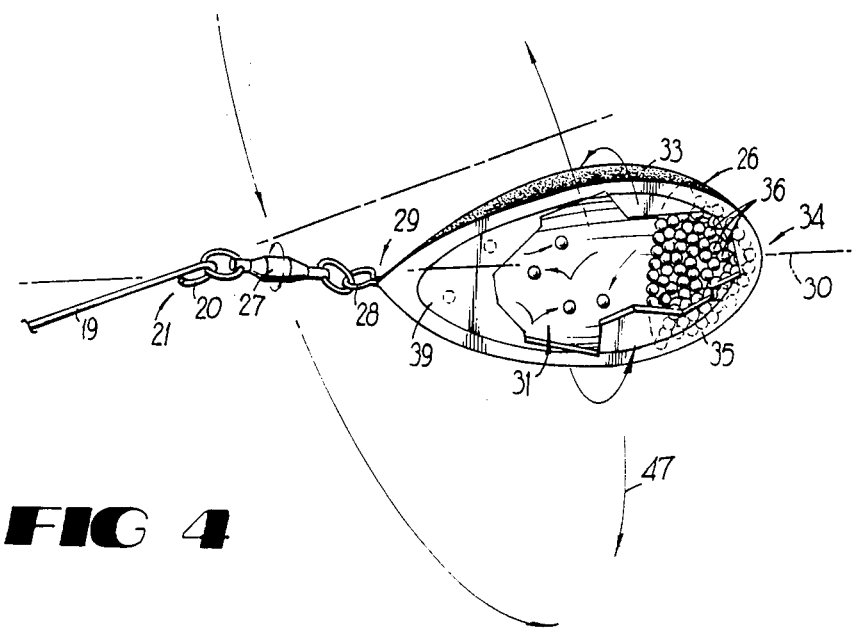
FIG. 4 is a pictorial view, in enlarged scale, of the buoyant member (shown partially broken away) undergoing rotation and gyrating movement through the water.

The other side 35 of the buoyant member 26 is substantially flat from the near end 29 to the far end 34, thereby effectively enclosing and partially defining the hollow cavity 31 within the buoyant member 26. A quantity of pellets such as lead shot 36 or the like is loosely disposed within the hollow cavity 31 and this shot is free to roll or otherwise move within that cavity. Most of the loose shot 36 are shown in FIG. 4 clustered together toward the far end 34 of the buoyant member 26, illustrating the effect of forces arising from forward and gyrating movement of the buoyant member as described below.

Figure 1A:
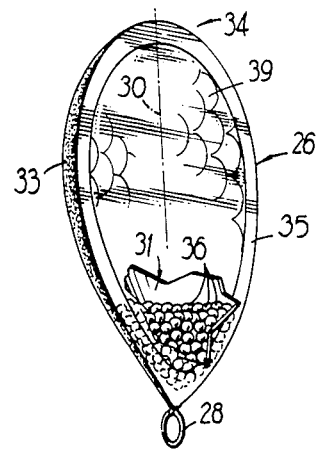
FIG. 1A is an enlarged pictorial view, partially broken away for illustration, of the buoyant member in the embodiment of FIG. 1.

The shell of the buoyant member 26, comprising the pear-shaped half side 33 and the relatively flat other half side 35, preferably are formed of suitable plastic or other relatively lightweight material to provide the desired buoyant effect. The sides of the buoyant member are relatively thin and hard, to enhance the noise-making effect of the loose shot 36 rattling within. As seen in FIG. 1, the one side 33 is painted or otherwise marked to simulate, for example, the scales and other coloration of a bait fish. Turning to FIG. 1A, the relatively flat other side 35 of the buoyant member has a number of small highly-polished reflective segments 39. These reflective segments 39 glint with reflected illumination as the buoyant member 26 moves and gyrates through the water, thereby visually attracting fish to the vicinity of the lure 10.

FIG. 1 shows the lure 10 sinking in the water, after the fisherman has cast the lure. The weight and buoyancy of the buoyant member 26, including the shot 36 contained within, is such that the buoyant member alone, if detached from the arm 19, would float. However, considering the overall buoyancy of the lure 10 including the buoyant member 26, the lure has negative buoyancy. Accordingly, the lure 10 sinks until coming to rest at the bottom 44 as shown in FIG. 2. However, the buoyancy of the buoyant member 26, acting on the remote end 21 of the arm 12, maintains the lure body 11 in an upright position within the water. In this upright position, the pointed end 22 of the fish hook 12 cannot drag the bottom 44 and thus is less likely to snag obstructions on the bottom. Because the eyelet 20 at the remote end of the arm 19 is positioned substantially above the side of the lure body 11 in horizontal attitude, the buoyant force acts through the center of mass of the lure body and maintains the lure body in a substantially level attitude while the lure 10 sinks in the water, as shown in FIG. 1. The buoyant member 26 rotates or oscillates due to the water movement past the assymetrical shape of the buoyant member as the lure sinks in the water, and this movement tends to attract fish to the sinking lure.

The longitudinal axis 30 of the buoyant member 26 remains substantially upright in the water while the lure 10 is stationary and sinking, as seen in FIG. 2. The loose shot 36 within the hollow cavity of the buoyant member at this time gravitate to the relatively narrow end of the hollow cavity, adjacent the near end 29 of the buoyant member. This distribution of the shot 36 within the buoyant member 26 lowers the center of mass of the buoyant member, and thus helps maintain the buoyant member in the vertical attitude to best stabilize the lure body 11 in the water.

Figure 3:
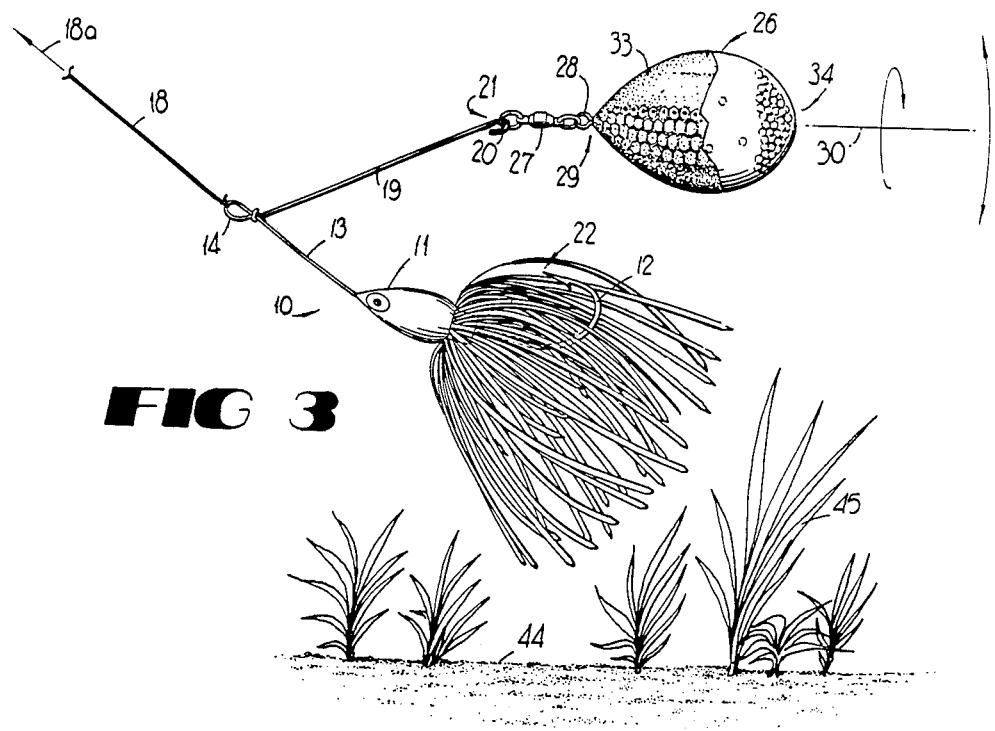
FIG. 3 is a view as in FIG. 2, except that the fishing lure is being pulled through the water.

When the fisherman pulls the fishing line 18, the fishing lure 10 is pulled forwardly as illustrated at 18a in FIG. 3. The pull on the fishing line 18 typically is in a diagonal direction as illustrated in that Figure, moving the lure 10 forward and up off the bottom 44. This forward movement through the water produces a frictional drag force acting on the buoyant member 26, causing the buoyant member to tip rearwardly from its stationary vertical position, seen in FIG. 2, to a position shown in FIG. 3 wherein the longitudinal axis 30 of the buoyant member is tipped back at a variable diagonal or horizontal attitude. FIG. 4 depicts in greater detail this tipped-back position of hte buoyant member 26.

The frictional drag force now acting on the buoyant member 26 also causes that member to gyrate or rotate relative to the arm 19 which tows the buoyant member through the water. The assymetrical shape of the buoyant member 23, provided in the disclosed embodiment by the pear-shaped one side 33 and the substantially flat other side 35, produces an erratic tumbling or gyrating movement of the buoyant member 26 about its longitudinal axis 30, and also causes the buoyant member to gyrate erratically on a circular path 47 (FIG. 4) defined around the longitudinal axis of the arm 19. These erratic movements of the buoyant member 26, combined with the forward towing force applied to the buoyant member, move the loose shot 36 away from the relatively narrow near end of the hollow cavity 31 and toward the far end of that cavity, as illustrated in FIG. 4. This movement of the loose shot 36 displaces the center of mass of the buoyant member further away from the swivel 27, and thus causes the buoyant member to undergo more-pronounced gyrations in response to the forces acting on that moving body. Moreover, the tumbling and gyrating movement of the buoyant member agitates the loose shot 36 within the hollow cavity 31, so that the shot rattles against itself and against the sides defining the hollow cavity. This rattling noise, combined with the glinting effect produced by the reflective segments 39 on the side 35 of the buoyant member, is attractive to fish as the lure 10 is pulled through the water. The visual effect of the buoyant member 26 thus resembles a conventional spinner rotating and flashing in the water, while the buoyant member is pulled forwardly through the water.

If the fisherman momentarily pauses after pulling on the fishing line 18, the lure 10 becomes stationary in the water and the buoyant member once again assumes the upright attitude shown in FIGS. 1 or 2. The fisherman thus can alternatively pull and slacken the fishing line 18, causing the lure 10 to alternate between the moving and stationary states previously described. In either case, the loose shot 36 within the buoyant member 26 assumes the position which optimizes either the upright buoyancy of the buoyant member, or the gyratory and rotating motion of that member, as described above.

It should be understood that the foregoing relates only to a preferred embodiment of the present invention, and that numerous changes and modifications may be made without departing from the spirit and scope of the invention as defined in the following claims.

I claim:

1. A fishing lure comprises:
a lure body;
means at one end of said lure body to attach a fishing line;
a fishing hook extending from said lure body;
an arm associated with said lure body and extending outwardly with respect to a side of the lure body;
a buoyant member attached to said arm in spaced apart relation to said lure body, whereby the buoyant member maintains the lure in a predetermined upright attitude as the lure sinks in a body of water;
said fishing hook having a pointed end disposed to lie above said lure body when said buoyant member maintains the lure in said predetermined upright attitude, thereby reducing the likelihood that the pointed end becomes snagged as the lure is at the bottom of the body of water;
means swivelably interconnecting said buoyant member to said arm;
said buoyant member having a closed hollow interior containing a quantity of shot loosely disposed for movement within the hollow interior;
said hollow interior having a longitudinal dimension and being relatively narrow at the end nearest said swivelable interconnection; and
the hollow interior widening as the longitudinal distance increases from said swivelable interconnection,
so that the loose shot collects at the relatively narrow end of the hollow interior as the buoyant member maintains a substantially vertical attitude in the water with no forward movement in the water, thereby enhancing the upright stability of the buoyant member,
and
so that the loose shot is permitted to move away from the relatively narrow end of the hollow interior to the wider part of the hollow interior as the buoyant member leaves the vertical attitude and undergoes gyrating movement in the water in response to forward movement of the fishing lure, thereby changing the center of gravity of the buoyant member to destabilize and enhance the gyrating movement.

2. The fishing lure as in claim 1, wherein:
said buoyant member has an asymmetrical exterior shape imparting an irregular tumbling movement to the buoyant member in response to said forward movement,
thereby causing the loose weights to rattle within said wide end of the hollow interior.

3. A fishing lure as in claim 1, wherein:
said buoyant member comprises two dissimilar exterior surfaces; and
one of said surfaces being curvilinear and the other said surface being flat,
so that water flowing over said two surfaces imparts dissimilar forces to the buoyant member when the fishing lure is pulled through the water, thereby imparting an irregular tumbling movement to the buoyant member and causing the loose shot to rattle within said hollow interior.

4. A fishing lure comprising:
a nonbuoyant lure body including a fishing hook having a pointed end;
a buoyant member movably connected to said lure body to maintain the lure body in a body of water in an upright attitude with the pointed end of the hook above the lure body; said buoyant member having a substantially pear-shaped hollow interior with a narrow end proximal to the movable connection and a wide end distal thereto;
a quantity of loose weights movably contained within said hollow interior;

said buoyant member with the loose weights lacking sufficient buoyancy to raise said lure body to the surface of the water, so that the fishing lure sinks with the pointed end of the hook in the upright attitude;

the loose weights gravitating to the narrow end of the buoyant member as the buoyant member maintains a substantially vertical attitude in the water with no forward movement, thereby enhancing the upright stability of the buoyant member; and the loose weights moving away from said narrow end and toward the distally-located wider end as the buoyant member departs from the vertical attitude in response to forward motion of the lure through the water, thereby changing the center of gravity and the dynamic stability of the buoyant member.

* * * * *